United States Patent
Nooijen et al.

(10) Patent No.: US 10,400,705 B2
(45) Date of Patent: Sep. 3, 2019

(54) INJECTOR ASSEMBLY AND METHOD OF USING SAME

(71) Applicants: Paul Johan Willem Maria Nooijen, Oss (NL); Jaroslav Hlousek, Golling (NL)

(72) Inventors: Paul Johan Willem Maria Nooijen, Oss (NL); Jaroslav Hlousek, Golling (NL)

(*) Notice: Subject to any disclaimer, the term of this patent is extended or adjusted under 35 U.S.C. 154(b) by 3 days.

(21) Appl. No.: 15/545,767

(22) PCT Filed: Jan. 22, 2016

(86) PCT No.: PCT/NL2016/050053
§ 371 (c)(1),
(2) Date: Jul. 24, 2017

(87) PCT Pub. No.: WO2016/118012
PCT Pub. Date: Jul. 28, 2016

(65) Prior Publication Data
US 2018/0347500 A1 Dec. 6, 2018

(30) Foreign Application Priority Data
Jan. 23, 2015 (NL) .................................. 1041155

(51) Int. Cl.
*F02D 41/38* (2006.01)
*F02M 43/04* (2006.01)
(Continued)

(52) U.S. Cl.
CPC ..... *F02D 41/3872* (2013.01); *F02D 19/0694* (2013.01); *F02D 19/105* (2013.01);
(Continued)

(58) Field of Classification Search
CPC ............ F02D 41/3872; F02D 19/0694; F02D 41/0027; F02D 19/105; F02M 55/004;
(Continued)

(56) References Cited

U.S. PATENT DOCUMENTS

| | | | | |
|---|---|---|---|---|
| 5,666,916 A | * | 9/1997 | Fujieda | F01L 1/267 123/295 |
| 6,311,667 B1 | * | 11/2001 | Satou | F01L 1/34 123/295 |

(Continued)

FOREIGN PATENT DOCUMENTS

| | | |
|---|---|---|
| DE | 4115478 | 11/1991 |
| EP | 0980471 | 2/2000 |

(Continued)

*Primary Examiner* — Joseph J Dallo
(74) *Attorney, Agent, or Firm* — Michael J. Feigin, Esq.; Feigin and Fridman (57) ABSTRACT

An assembly at least comprising a fuel injector for dual fuel operation of an internal combustion engine. The assembly includes a nozzle holder defining a fuel circuit and provided with a nose adapted in use to be in connection with a combustion space of an internal combustion engine, and first and second nozzles in communication with the fuel circuit in the nozzle holder for directly injecting liquid fuel into the combustion space of the internal combustion engine for ignition of a combustible mixture present in the combustion space. The first and second nozzles adjacent to the nose of the nozzle holder are interconnected by a cooling channel. At each actuation of a fuel pump upstream of the first and second nozzles, substantially a full volume of fuel pumped during actuation of the fuel pump is allowed to flow through the cooling channel and via the first and second nozzles.

20 Claims, 6 Drawing Sheets

(51) Int. Cl.
  *F02M 45/08*   (2006.01)
  *F02M 47/02*   (2006.01)
  *F02M 53/04*   (2006.01)
  *F02M 55/00*   (2006.01)
  *F02M 57/00*   (2006.01)
  *F02M 57/02*   (2006.01)
  *F02M 59/10*   (2006.01)
  *F02M 61/18*   (2006.01)
  *F02D 19/06*   (2006.01)
  *F02D 19/10*   (2006.01)
  *F02D 41/00*   (2006.01)
  *F02M 43/00*   (2006.01)
  *F02M 61/16*   (2006.01)
  *F02M 63/02*   (2006.01)
  *F02D 35/02*   (2006.01)

(52) U.S. Cl.
  CPC ..... *F02D 41/0025* (2013.01); *F02D 41/0027* (2013.01); *F02M 43/04* (2013.01); *F02M 45/08* (2013.01); *F02M 47/027* (2013.01); *F02M 53/043* (2013.01); *F02M 55/004* (2013.01); *F02M 57/005* (2013.01); *F02M 57/023* (2013.01); *F02M 59/102* (2013.01); *F02M 61/18* (2013.01); *F02D 35/023* (2013.01); *F02D 35/025* (2013.01); *F02D 2041/389* (2013.01); *F02M 43/00* (2013.01); *F02M 45/086* (2013.01); *F02M 61/161* (2013.01); *F02M 63/0225* (2013.01); *F02M 2200/16* (2013.01); *F02M 2200/18* (2013.01); *F02M 2200/247* (2013.01); *F02M 2200/44* (2013.01); *F02M 2200/46* (2013.01); *F02M 2200/8061* (2013.01); *F02M 2200/8069* (2013.01); *Y02T 10/36* (2013.01)

(58) Field of Classification Search
  CPC .... F02M 61/18; F02M 59/102; F02M 57/023; F02M 57/005; F02M 53/043; F02M 47/027; F02M 43/04; F02M 61/161; F02M 45/086
  See application file for complete search history.

(56) References Cited

U.S. PATENT DOCUMENTS

| | | | |
|---|---|---|---|
| 7,066,149 B1* | 6/2006 | Date | F02D 33/006 123/447 |
| 2003/0038185 A1 | 2/2003 | Carrol | |
| 2008/0314363 A1* | 12/2008 | Bailey | F02B 23/063 123/445 |
| 2014/0230762 A1* | 8/2014 | Nakashima | F01L 1/3442 123/90.12 |
| 2015/0300287 A1* | 10/2015 | Ulrey | F02D 41/221 701/103 |
| 2015/0354491 A1* | 12/2015 | Ulrey | F02D 41/123 123/294 |
| 2016/0177860 A1* | 6/2016 | Pursifull | F02D 41/0025 123/294 |
| 2016/0377015 A1* | 12/2016 | Pursifull | F02M 55/025 701/103 |
| 2016/0377016 A1* | 12/2016 | Ulrey | F02D 41/3845 701/103 |
| 2016/0377017 A1* | 12/2016 | Basmaji | F02D 41/3845 701/103 |
| 2017/0022927 A1* | 1/2017 | Sanborn | F02M 59/20 |
| 2017/0023165 A1* | 1/2017 | Fujita | F04B 39/0033 |
| 2017/0159597 A1* | 6/2017 | Omi | F02D 41/28 |
| 2018/0230931 A1* | 8/2018 | Imai | F02D 41/40 |

FOREIGN PATENT DOCUMENTS

| | | |
|---|---|---|
| JP | 3149756 | 3/2001 |
| JP | 3366495 | 1/2003 |

* cited by examiner

INJECTOR ASSEMBLY AND METHOD OF USING SAME

The invention relates to a fuel injector which is specifically arranged for a dual fuel operation of an internal combustion engine (i.e. an engine which can selectively operate on two different fuels). This engine can run completely on both diesel and gas. When using gas as a main fuel, a small amount of diesel fuel is then injected for ignition. This injector is provided with two nozzles adjacent to each other, in a single housing. One large nozzle for running fully on diesel fuel and one small nozzle for ignition of fuel (called "micro-pilot").

A dual fuel injector with two nozzles is known from the published US patent application document No. US 2014/0196687A1, a disadvantage of the known solution described therein is that the fuel in the nozzle tip does not circulate and therefore becomes heated due to the heat of the combustion chamber. When the fuel gets hot tar that forms can cause the needle eventually to get stuck. Another disadvantage of this known device is that the use of space in the injector is not very efficient, leaving little or no space for adding a combustion pressure sensor. A combustion pressure sensor is useful in controlling a dual fuel engine, because the quality of gas is variable. By controlling the supply of gas by means of a combustion pressure sensor, the ignition and combustion can take place at the correct time and with the correct amount gas. Both of these parameters relating to time and volume have an effect on eliminating detonation (also referred to as pinging, which is an uncontrolled combustion taking place in the combustion chamber), which can cause engine damage. The detonation itself can also be detected by a combustion pressure sensor. A further drawback of the known device is that it provides no possibility of detection of a gas leak. A gas leak in a dual fuel engine, for instance on board of a ship where crew usually live, eat, sleep and work above the engine room, can have disastrous consequences. Providing a solution to detect a gas leak is therefore also of vital importance and a primary safety item.

The object of the invention is to provide an assembly by which the aforesaid problems are eliminated or at least reduced.

At least one of these objects is achieved with an assembly according to the invention, as defined in any one or more of the claims appended to this specification.

The invention relates to a single unit fuel injector that solves a number of different problems, but is nonetheless a single article of manufacture. Hence the corresponding technical effect is the improvement of the fuel injector as a whole, and is therefore considered that the invention is a unitary invention.

One feature of the invention is that the injector is cooled by diesel fuel. Thereto an assembly comprises a diesel fuel injector generally of a type as disclosed in patent publication US 2014/0196687A1, but which is equipped with two nozzles, wherein nozzles at the level of their nose are connected with each other by means of a cooling channel or duct, and wherein a pump (optionally a plunger or piston pump) by means of each activation (pump stroke of a plunger pump) pumps approximately the entire pump volume of fuel through the cooling channel and past the nozzles, and thereby cools parts that are most exposed to heat.

Optionally the assembly according to the invention can have its nozzles carried out as a micro-pilot injector nozzle and main injector nozzle, with an opening pressure of the micro-pilot injector nozzle being less than an opening pressure of the main injector nozzle. Thereby it is possible to inject fuel only through the micro pilot injector by a fuel spill valve, provided that the duration is short enough for the pressure not to rise so high that the main injector will open. When operated in a full diesel fuel mode, the micro pilot injector and the main fuel injector are both used to inject fuel. Nonetheless a pilot amount of fuel will then first be injected at a still relatively low pressure before the main fuel injector is joining the process, when full pressure has been attained. This has the advantage that it improves the combustion by a more gradual introduction of fuel molecules, which also reduces soot production and noise. Also this will give a better combustion of diesel fuel than is obtainable with a common rail system, because with a common rail system the pressure at initial opening of the nozzle is already at its maximum pressure. Too high fuel pressure at the initial opening of a nozzle causes unnecessary soot and noise. The assembly according to the invention can also include more than two nozzles, or conceivably can only have one single nozzle. In the assembly according to the invention the nozzles can be mounted in a nozzle holder by means of a press-fit or by means of brazing. When mounted by a press-fit or by brazing sealing against leakage of diesel fuel and/or combustion pressure can be prevented.

In the assembly according to the invention the injector or nozzle needle of the micro pilot injector by means of a shorter spring stop can be so equipped that it can make a larger stroke than strictly necessary for diesel fuel dosage. By moving the needle volume is created under the needle so that the pressure will be rising less rapidly, and the micro pilot can inject longer before the main pilot also going to work.

The assembly according to the invention can also be modified in that the fuel supply circuit includes a one-way valve so that fuel does not flow back to the fuel supply channel as the pump starts to pump.

The micro-pilot injector can be equipped with a single hole. Alternatively the micro-pilot can be carried out with a number of pinholes. As a further option the micro-pilot can be carried out with smaller holes than the main injector. It is also possible to execute the micro-pilot as a combination of the mentioned options.

In an assembly according to the invention, when the micro-pilot injector is provided with a smaller through-flow opening than the two needles together, a quantity of diesel fuel for the purpose of ignition of a combustible mixture can be metered accurately. In connection therewith an abutment stop can be omitted so that the opening pressure remains lower, and hence the operation of only the micro pilot can be kept longer.

The injector can alternatively or additionally be fitted with a combustion pressure sensor, and/or a gas channel for direct injection into a combustion chamber. Thereto the assembly comprises a diesel fuel injector, again generally as known from patent publication US 2014/0196687A1, but in which the injector is equipped with a combustion pressure sensor (CPS). Equipping the injector with a combustion pressure sensor can be independent of nozzles of the injector being connected at their noses by a cooling channel or duct. In all such assemblies the combustion pressure sensor can be mounted in a nozzle holder by means of a press-fit, and thereby close it against leakage of fuel pressure and/or combustion pressure. Optionally this combustion pressure sensor can be mounted by means of a screw thread in the nozzle holder, to provide a similar seals against leakage of fuel pressure and/or combustion pressure. The combustion pressure sensor can be held in position by a U-shaped spacer, which in a larger diameter portion above the combustion pressure sensor in the nozzle holder. In such an assembly a leak-tight sealing body at its top can be provided with sealing rings. Sealing rings cannot creep between the sealing body and the sensor channel, because the sensor channel is too small. This while the sealing of on the one hand the fuel leak into the channel or duct, and the engine oil on the other hand is taken care of on basis of the seals or sealing rings, which seal on the sealing body and seal housing. The seals or sealing rings may comprise one, two, three or more O-rings, or one or several other type of barriers. The seals may also be enabled to slide over the sensor and sealing body.

In the assembly according to the invention sensor and sealing body can also be slid through the plunger housing and the spring housing. Other optional components can be pushed or slid over the sensor and the sealing body as well. After assembly of the sealing body in the plunger housing and assembly of the spring housing, the sensor wire may be provided with a body like a U-shaped spacer, which prevents the sensor from being pressed out of the nozzle housing by the combustion pressure.

The assembly of the invention can have the sensor mounted in the nozzle holder by means of a press fit for the purpose of its sealing.

The combustion pressure sensor can be of any suitable type, such as one or more piezoelectric elements, strain gauges or optical fibers. Alternatively the combustion pressure sensor can also be replaced by a sealing dummy, while higher up in the injector a fuel pressure sensor, based on the same principle as described above, can be placed. It is also an option to replace the combustion pressure sensor by a sealing dummy, while no combustion pressure sensor is placed at all. Also the combustion pressure sensor can be replaced by a temperature sensor, or the combustion pressure sensor can be combined with a temperature sensor.

In an assembly according to the invention either one or two injectors can be arranged as part of a common rail system.

The entire assembly according to the invention can be incorporated in a gas injector. The entire assembly can also include a micro pilot, and/or a main fuel injector. The assembly according to the invention can also be complemented with a gas injector. In combination with a gas injector a plunger diesel pump, which is actuated by a camshaft, pumps and injects a limited amount of diesel fuel at each engine cycle, while the gas injector is supplied by its own pump system. This setup is not to be confused with a system where the diesel fuel is supplied by a common rail. When combined with a gas injector, the gas injector can advantageously be placed adjacent to the diesel fuel injector or diesel fuel injectors. A similar effect may be obtained when the gas injector is placed around the diesel injector to thereby cool the diesel injector.

In an assembly according to the invention, which includes a gas injector, the gas injector can also be fitted with gas leak detection means, so that gas leakage between the connecting portions of the gas injector itself or between the gas injector and a gas rail or the cylinder head or between parts of the conduit between the injector and a gas tank, such as plunger pump housing and spring housing of the injector, can be detected by means of a gas leak detection channel isolated around the seals. A hole in the gas injector, through which the gas flows outside of the injector, can be made by means of spark erosion so that a thin elongated slit can be realized, which promotes mixing of the gas.

In an assembly according to the invention one or more cylinders can be switched off by means of skip fire, causing other cylinders to have to work harder, thereby more fuel is then given in the remaining operating cylinders, which thereby get a lower lambda value, and are beneficial to emission of methane. In case of separate exhaust systems, one exhaust system can be switched off completely at a, by means of skip fire, so that the other exhaust system is kept at a higher temperature so that an exhaust gas after treatment system will be able to work at a more convenient and higher temperature. The number of skip fires determined per 720 degrees rotation of the engine crankshaft can be evenly distributed. Per 720 degrees rotation of the engine crankshaft the number of skip fires can be zero, one, or n. When per 720 degrees rotation of the engine crankshaft, the number of skip fires is zero, one, or n, there can be an additional skip fire per m revolutions. In this way it is possible, for example, to skip fire 1.1 times, 2.6 times, etc. Skip fire can also be used in combination with a dual fuel diesel engine, which has gas as its major fuel.

In an assembly according to the invention, particular in combination with the usage of combustion pressure sensors, which can be configured as a system, a motor control system can be employed, which makes use of one or more FPGA's (Full Programmable Gate Array microchips) in lieu of one or more processors. The motor control system can also make use of one or more FPGA's (Full Programmable Gate Array micro-chips) in combination with one or more processors.

It will generally be understood by a skilled person that all the features relating to differential pressure nozzle operation, sensor mounting, press fitting of nozzles, fuel supply, gas injection, leak detection, and/or skip firing can each be employed also independently of and without tip cooling. Elimination of tip cooling can also reduce the size of the nozzle housing, as will a concentric arrangement of the micro-pilot, main fuel and/or gas injectors.

The injector assembly and application method according to the embodiments of the invention provide the benefits as further summarized at the end of the description. Other advantages will be explained with reference to the following description, in which:

Figures 2, 3:
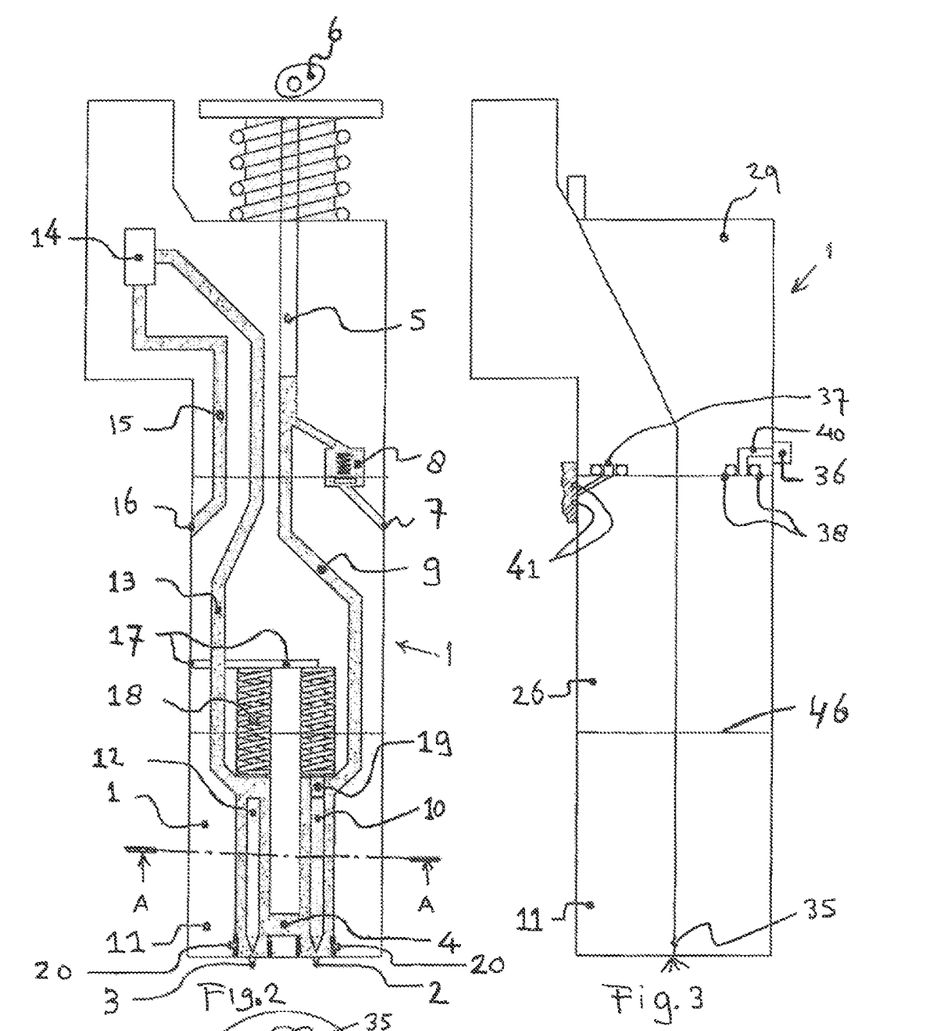
FIG. 2 shows a schematic longitudinal section of the injector according to the line C-C in FIG. 1.
FIG. 3 shows a schematic longitudinal section of the injector according to the line B-B in FIG. 1.

An injector 1 as shown in FIG. 2, is provided with a first nozzle 2 and a second nozzle 3 for fuel injection which are connected to each other by means of a cooling channel 4. Fuel is sucked in because plunger pump 5 is moved up and down by means of camshaft 6. During the suction stroke fuel such as diesel fuel will be sucked from a fuel supply channel 7 via a one-way valve 8, which ensures that when the piston 5 will compress the fuel does not flow back to the fuel channel 7. The fuel will then be moving through fuel supply channel 9 to the first nozzle embodied as micro pilot injector-nozzle 2, which is a nozzle that is specifically carried out in order to ignite a gas mixture with a smallest possible amount of fuel such as diesel fuel. To do this, the micro-pilot injector nozzle 2 can be arranged using, for example, only one or more relatively small hole(s) in relation to a main fuel injector as embodied by a second nozzle 3, which can inject fuel such as diesel fuel in the case of 100% diesel operation. An injector head of the main fuel injector 3 is equipped with several holes which are likely but not necessarily larger in diameter than those of the micro pilot injector 2. Importantly the through-flow area of the micro-pilot injector nozzle 2 is smaller than the combined through-flow area of the micro-pilot and main fuel injectors 2, 3 together. The entire volume of fuel displaced by the plunger pump 5 then flows through the main nozzle 3 via cooling channel 4, and through micro-pilot injector 2 along first and second injector or nozzle needles 10, 12, through a discharge channel 13 to a spill valve 14, and then through discharge channel 15 to the fuel supply channel and fuel discharge circuit 16, where also fuel leak 17 connects to. Once the spill valve 14 is closed fluid pressure increases, and the micro pilot injector 2, which is controlled by spring force of a compression spring 18, opens in advance of the main injector nozzle 3. Because the micro pilot injector 2 opens the pressure increase reduces for a short period of time. However, the hole in the nozzle of the micro-pilot injector 2 is so small in in relation to the plunger volume that the pressure eventually increases again. By keeping the spill valve 14 closed no longer than necessary to attain the opening pressure of the main injector 3, the main injector 3 does not start to inject and an accurate small quantity of fuel is dosed by means of only the micro pilot injector 2. In the case, it is desired for the micro pilot injector 2 to inject longer, it is possible for a stop 19 of the first needle 10 of the micro-pilot injector 2 to be made shorter so that the displacement of the first needle 10 becomes larger as a result of increasing pressure. By moving the needle, the volume under the needle and the pressure are increased at a slower rate, and the micro-pilot injector 2 can inject for a longer period of time.

The first and second nozzles 2, 3 are fitted, on a location indicated with reference numeral 20, by means of a press fit or a brazing connection in the nozzle holder 11 by which these are sealed against leakage resulting from the combustion pressure entering the injector, and leakage caused by fuel pressure of the injector. Around the cooling channel 4, the seal is not important because both the first and second nozzles 2, 3 are in contact with fuel all around. As further illustrated in FIG. 3 the seal between nozzle holder 11 and spring housing 26 is accomplished by means of smooth steel surfaces.

Combustion Pressure Sensor (CPS)

Figure 4:
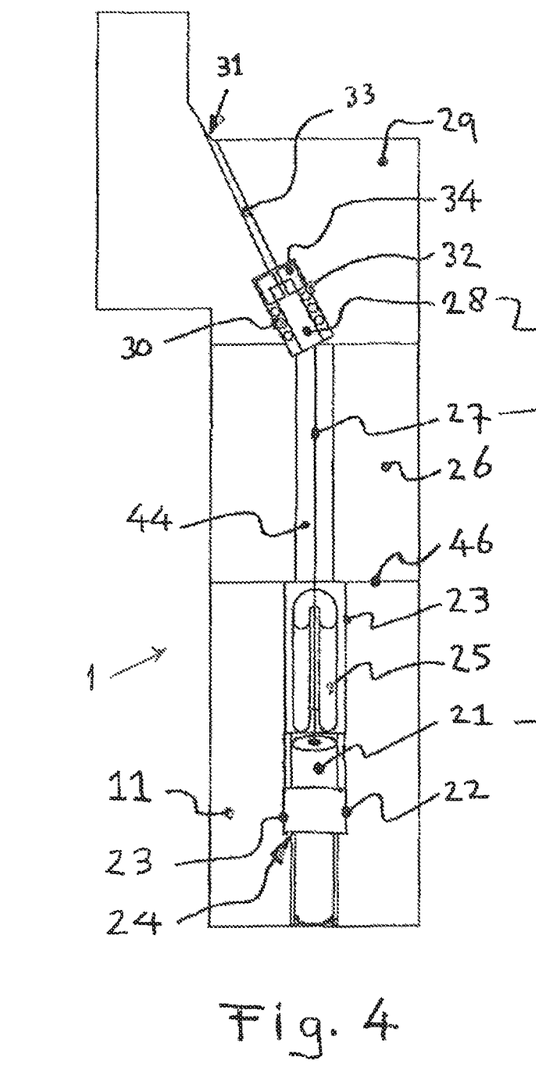
FIG. 4 is a schematic longitudinal sectional view of the injector taken along line D-D in FIG. 1.
Figure 5:
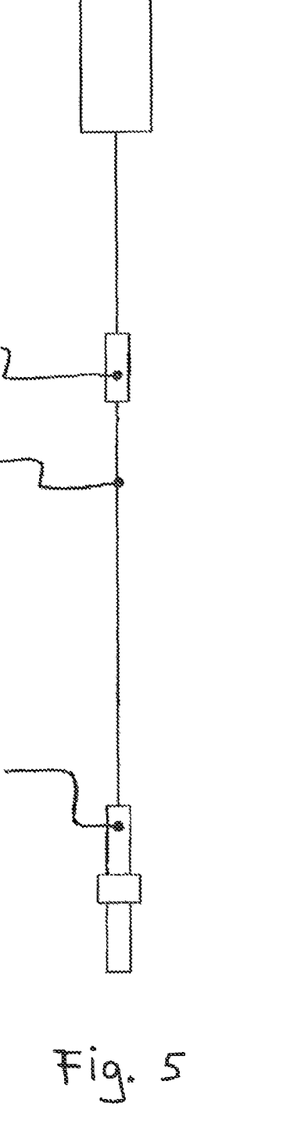
FIG. 5 shows a schematic view of a combustion pressure sensor unit.

Also a combustion pressure sensor 21, which is depicted in FIG. 5 by itself and in FIG. 4 as positioned in the injector 1, is fixed leak-proof by means of a press fit in the nozzle holder 11 at a location indicated by reference numeral 22, and is held in place in that the combustion pressure sensor 21 is provided with a thickened portion 23 which rests on a narrowing or restriction 24. The combustion pressure sensor 21 can not be pushed upwards by the combustion pressure, because it is retained by a U-shaped spacer 25 which has a larger diameter than the combustion pressure sensor 21. The U-form of the spacer 25 cannot move further upwards because it is supported by a surface 46 surrounding a hole with a smaller diameter than the U-shaped spacer in the spring housing 26, which is a separate individual part with a bore of a smaller diameter than the U-shaped spacer 25, but bigger than the sensor 21. On a signal wire 27 of the combustion pressure sensor 21 is mounted a leak-tight sealing body 28 such that after placement it fits exactly in a seal housing 32. Between the seal housing 32 and the sealing body 28 there are seals, such as, for example, O-rings 30. These seals 30 ensure that no fuel can reach engine oil 31 through the sensor channel 33. The signal wire 27 can be implemented as a flexible or as a soft metal conduit which is bendable. In the event that the signal wire 27 is of flexible design, then it is desirable to be able to secure the sealing body 28 so that it stays in position. In order to prevent the signal wire 27 from breaking, or that a leak could develop, there are placed two half-moons or crescents 34. The combustion pressure sensor 21 can be of any suitable type, such as on basis of strain gauges, piezoelectric or fiber optic. Further, it is possible, instead of a combustion pressure sensor, to position a temperature sensor, or a diesel pressure sensor at a higher place in the injector.

Gas Injector

Figure 1:
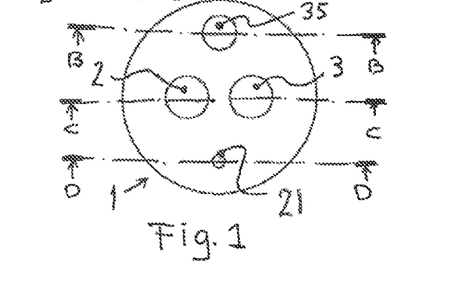
FIG. 1 shows a schematic transverse cross section of an injector in accordance with the line A-A in FIG. 2.

The complete assembly can also be carried out with a channel in the same injector with which gas is injected directly into the combustion chamber. This is shown in FIGS. 1 and 3, by reference numeral 35. The gas injector 35 can be placed at different locations and this is illustrated in FIG. 1, showing the cross-section A-A of the complete injector as shown in FIG. 2. An option may be that the gas duct is provided surrounding the diesel or fuel injectors. As a result, the diesel fuel, is cooled by the cold gas. Alternatively, the gas injector 35 may also be positioned next to the first and second fuel injectors 2, 3. By making a combination of a cam shaft 6, and a conventional pump 5 for the purpose of the diesel fuel supply, and in addition a gas injection channel with its own supply, a good diesel and gas supply or injection for a dual fuel engine can be easily taken care of. Further, the gas injector 35 in FIG. 3 may be implemented so that a gas leak in the injector and the piping of the gas tank to the injector can be detected. This detection can be done by means of a double seal 38, by which a self-contained sensing chamber 37 is created. This detection chamber 37 is connected by means of again relatively small channels 40, and O-rings, or seals such as 41. Flanges between gas conduits can also be provided with double seals, and are connected by small channels 40, and so are all connected to one and the same circuit so that gas leakage can be detected. In detection chamber 37 a constant pressure can prevail of optionally an inert gas which in addition to the temperature of the air is measured in order to compensate if the entirety is warmer or colder. As soon as the pressure changes, there has been leakage and service people may, when there is an alarm, remedy the leakage. The gas leak detector 36 can also take place by the combination of extraction and gas detection. By detecting a gas leak the risk of a gas explosion can be reduced. Furthermore, the bore in the gas injector, through which the gas flows in the motor, can be made by means of spark cutting or spark erosion. With this method, a thin elongated aperture can be created so that the gas can be mixed well with the pilot fuel and the oxygen present. Due to good gas mixing emissions of $NO_x$, $CH_4$, soot are limited, as is knocking.

Dual Fuel Method

When the described diesel engine is fully switched to gas, with a small amount of pilot fuel or diesel fuel for the ignition, there is by the lack of a shutoff valve in the diesel engine a high probability that the amount of air is too large and thereby causes the gas flame to be virtually blown out, whereby the gas will enter the exhaust unburned. Unburned gas or $CH_4$ is considerably (28 times) more damaging to the environment than $CO_2$. $CH_4$ gas corresponds to unburned fuel that has first been obtained against payment, making unburned $CH_4$ gas in the exhaust also an economic loss. This disadvantage can be prevented by skipping a combustion stroke by dosing no fuel (no diesel fuel and no gas) in that particular stroke. This is referred to as skip fire. Skip fire means that in fact one or more cylinders are being temporarily disabled. By disabling cylinders the other cylinders will have to produce more power, so that these get more fuel for substantially the same amount of air, making the ratio of fuel and air in the other cylinders more favorable. Less unburned gas will then enter the exhaust system. When the combustion engine has separate exhaust systems, one of these exhaust systems can completely and permanently be disabled by means of skip fire, allowing the other exhaust system to get hotter, which also benefits a possible exhaust gas after treatment system, with a more favorable and higher temperature for its operation.

Thus an injector is described for dual fuel operation of internal combustion engines, which can run on a majority of gas as fuel and a small part diesel as fuel to ignite the gas mixture. The combination of the technologies in the dual fuel injector, according to the invention, includes double nozzle's, in the form of a diesel main injector and a diesel micro pilot, a cooling means based on diesel fuel flow through the nozzle noses to cool the injectors. Optionally a combustion pressure sensor, a temperature sensor, a diesel pressure sensor, a gas injector, and/or a gas leak detection system may also be fitted. The injector can be so operated with a skip fire algorithm that the emissions of $NO_x$ and $CH_4$ are minimized.

More specifically as also explained above the invention concerns an assembly that includes a diesel injector, as we know from the published US patent application US 2014/0196687A1, which is operated with two nozzles (FIG. 2, reference numerals 2 and 3) with the nozzles among themselves connected at the level of their noses by means of a cooling channel (FIG. 2, reference numeral 4). With every stroke of the pump plunger pump (FIG. 2, reference numeral 5) approximately the complete fuel volume of the pump is pumped, by each displacement of the pump piston, through the cooling channel and cools the nozzles. The nozzles (FIG. 2, reference numerals 2 and 3) are laid out as micro pilot injector (FIG. 2, reference numeral 2) and as main injector (FIG. 2, reference numeral 3), where the opening pressure of the micro pilot injector is lower than the opening pressure of the main fuel injector so that it is possible only to activate the micro pilot injector to inject fuel. Provided that fuel is injected short enough by using the spill valve (FIG. 2, reference numeral 14) in such a way that the pressure is not so high that the main injector opens it is possible to only open the micro-pilot injector.

Conceivably, the assembly may include but one single nozzle that is mounted or provided for this purpose only. At the assembly also more than two nozzles can be mounted or fitted. Furthermore, two nozzles can be put concentrically inside one another, rather than next to each other.

In the assembly, the nozzles (FIG. 2, reference numerals 2 and 3) can advantageously be press fitted or brazed by high tech vacuum (FIG. 2, reference numeral 20) at the bottom of the nozzle holder (FIG. 2, reference numeral 11), with the press fit ensuring the sealing, and preventing leakage of diesel fuel and combustion pressure.

With the assembly, the injector or nozzle needle (FIG. 2, reference numeral 10) of the micro pilot injector (FIG. 2, reference numeral 2) by a shorter spring abutment (FIG. 2, reference numeral 19) can be so equipped that this can make a greater stroke than would be strictly necessary for the dosage of diesel fuel. By moving the needle a volume is created under the needle, which will allow the fluid pressure to increase less rapidly, and the micro pilot injector can thereby inject longer before the main injector also starts to operate.

In the assembly also a one-way valve (FIG. 2, reference numeral 8) can be incorporated in the supply channel (FIG. 2, reference numeral 7) to the displacement piston pump (FIG. 2, reference numeral 5), so that the fuel does not flow back to the fuel supply channel (FIG. 2, reference numeral 7) when the displacement piston pump starts to pump.

The micro pilot injector is conveniently equipped with one single hole. It is also possible for the micro pilot injector to be equipped with a lesser number of holes than the main injector. Further, the micro pilot injector in the assembly of the invention is advantageously carried out with smaller holes than the main injector. Further, the micro pilot injector in the assembly according to the invention may also be carried out with a combination of the above mentioned characteristics.

The assembly, or may be a part of the assembly, can also be embodied as a common rail fuel injection system. Also, the amount of diesel fuel for the purpose of igniting the mixture can be dosed accurately in that the micro pilot injector is provided with a smaller through-flow opening, and by elimination of the stop (FIG. 2, reference numeral 19) so that the opening pressure stays lower, and hence the operation of only the micro pilot injector can be continued longer.

In the assembly with a diesel injector, as is known from the published U.S. patent application US 2014/0196687A1, the injector can be (FIG. 2, reference numeral 1) are equipped with a combustion pressure sensor or CPS (FIG. 4, reference numeral 21). In this assembly the combustion pressure sensor (FIG. 4, reference numeral 21), can then optionally be mounted by an interference fit (FIG. 4, reference numeral 22) in the nozzle holder (FIGS. 2 and 4, reference numeral 11), by which it can seal against leakage of fuel pressure and combustion pressure. Further, this combustion pressure sensor (FIG. 4, reference numeral 21) can optionally be mounted by screw thread in the nozzle holder (FIG. 4, reference numeral 11), and thereby also seal against leakage of fuel pressure and combustion pressure. The same combustion pressure sensor (FIG. 4, reference numeral 21) can, in the assembly of the invention, also be held in place by a U-shaped spacer (FIG. 4, reference numeral 25), which does not fit in the spring housing (FIG. 4, reference numeral 26), but only fits in the larger diameter above the combustion pressure sensor (FIG. 4, reference numeral 21) in the nozzle holder (FIG. 4, reference numeral 11).

The sealing body (FIG. 4, reference numeral 28) in the assembly of the invention can also at its top be provided with two accurately fitting crescents or half-moons (FIG. 4, reference numeral 34) which prevent that the sealing body (FIG. 4, reference numeral 28) is pushed upwards by the pressure in sensor channel (FIG. 4, reference numeral 33). Optionally, it is also possible that no half-moons are used in the assembly, when the sealing body (FIG. 4, reference numeral 28) fits in the sensor channel (FIG. 4, reference numeral 33) in such a way that the seals or sealing rings (FIG. 4, reference numeral 30) cannot creep between the sealing body (FIG. 4, reference numeral 28) and sensor channel (FIG. 4, reference numeral 33). The sealing on the one hand of fuel leak in the duct 44 and on the other hand of the engine oil (FIG. 4, reference numeral 31) is accomplished by the seals (FIG. 4, reference numeral 30), which seal on the sealing body (FIG. 4, reference numeral 28) and seal housing (FIG. 4, reference numeral 32). The seals may comprise one, two, three or more O-rings, or one or more seal rings. In addition, the seals (FIG. 4, reference numeral 30) are able to slide over the sensor (FIG. 4, reference numeral 21) and the sealing body (FIG. 4, reference numeral 28).

In the assembly, the sensor (FIG. 4, reference numeral 21) and the sealing body (FIG. 4, reference numeral 28) can also optionally be slid through the plunger pump housing (FIG. 4, reference numeral 29) and the spring housing (FIG. 4, reference numeral 26). Optionally, crescents (FIG. 4, reference numeral 34) are arranged and/or other components may also be slid over the sensor (FIG. 4, reference numeral 21) and the sealing body (FIG. 4, reference numeral 28). After mounting of the sealing body (FIG. 4, reference numeral 28) in the plunger pump housing (FIG. 4, reference numeral 29) and after assembly of the spring housing (see FIG. 4, reference numeral 26), the sensor signal line (FIG. 4, reference numeral 27) may in the assembly be provided with a U-shaped spacer (FIG. 4, reference numeral 25) which prevents the sensor being pressed from the nozzle holder housing (FIG. 4, reference numeral 11) by the combustion pressure.

In addition, the sensor (FIG. 4, reference numeral 21) in the nozzle holder (FIG. 4, reference numeral 11) can also be applied by means of a press fit (FIG. 4, reference numeral 22) for the purposes of sealing. The combustion pressure sensor (FIG. 4, reference numeral 21) can of all types, including one or more piezo elements, optical fiber or strain gages. The combustion pressure sensor (FIG. 4, reference numeral 21) can also be replaced by a sealing dummy and a fuel pressure sensor can be placed higher in the injector on basis of the same mounting principle as described above. The combustion pressure sensor (FIG. 4, reference numeral 21) may also be replaced by a sealing dummy without presence of any combustion pressure sensor. Further, at the assembly according to the invention also optionally the combustion pressure sensor (FIG. 4, reference numeral 21) can be replaced by a temperature sensor. Also can the combustion pressure sensor (FIG. 4, reference numeral 21) can optionally be combined with a temperature sensor.

At the assembly of the invention can further include one or two injectors, which are operated as a common rail system. Also at the assembly of the invention can include a gas injector, a micro-pilot injector, a main fuel injector. The assembly can also be extended by a gas injector, which then concerns a combination of a diesel plunger pump (FIG. 2, reference numeral 5), which is arranged to be operated by or from a camshaft (FIG. 2, reference numeral 6), and which in each engine cycle pumps up pressure and injects. This combination with a gas injector that has its own pump system is not to be confused with a system in which the diesel fuel is supplied by a common rail.

The gas injector (FIG. 1, reference numeral 35) at the nozzle holder housing are advantageously placed adjacent to the diesel injector (FIG. 1, reference numeral 2). The gas injector (FIG. 3, reference numeral 35) can be placed around the diesel injector (FIG. 2, reference numeral 2) and thereby cool the diesel injector.

Further, at the nozzle holder housing the gas injector can be provided with gas leak detection (FIG. 3, reference number 36), so that between the connecting parts of the gas injector itself, or of the gas injector on the gas rail or on the cylinder head and of parts of the conduit between injector and gas tank, such as the bodies of the injector (FIG. 3, reference number 29 and FIG. 3, reference numeral 26), a gas leak by means of detection channel (FIG. 3, reference numeral 40) that is isolated around by seals (FIG. 3, reference numeral 38) can be detected.

The assembly of the invention may advantageously be such that the hole in the gas injector (FIG. 3, reference numeral 35), through which the gas flows out, is obtained by means of wire EDM, whereby a thin oblong crack-like opening is obtained, which promotes mixing of the gas.

Further in the assembly of the invention one or more cylinders can be disabled by means of skip fire, allowing other cylinders to work harder. As a result, the remaining active cylinders then are given more fuel resulting in a lower lambda value, which causes a reduction in methane emissions. Optionally, with separate exhaust systems skip fire can be used to temporarily disable one exhaust system completely, causing the other exhaust system to be kept at a higher temperature, thus creating a more favorable and higher temperature in an exhaust gas after treatment system, which will then be able to operate more efficiently. Also the number of skip fires determined per 720 degrees of crankshaft rotation can be evenly distributed. Per 720 degrees rotation of the engine crankshaft, the number of skip fires can be represented as n, where n may have a value of zero, one, or higher. Additionally or alternatively per 720 degrees crankshaft rotation of the engine, where the number of skip fires has the value of n, an extra skip fire per m revolutions may be introduced so that, for example, skip firing can be obtained of 1.1 times, of 2.6 times, etc. Skip fire in the assembly of the invention can also be employed in combination with a dual fuel diesel engine, which predominantly uses gas as a fuel.

In the assembly of the invention a motor control may be applied that uses one or more FPGA's (Full Programmable Gate Array micro chips) instead of one or more processors. The motor control can also use one or more FPGA's (Full Programmable Gate Array microchips) in combination with one or more processors.

Figure 6:
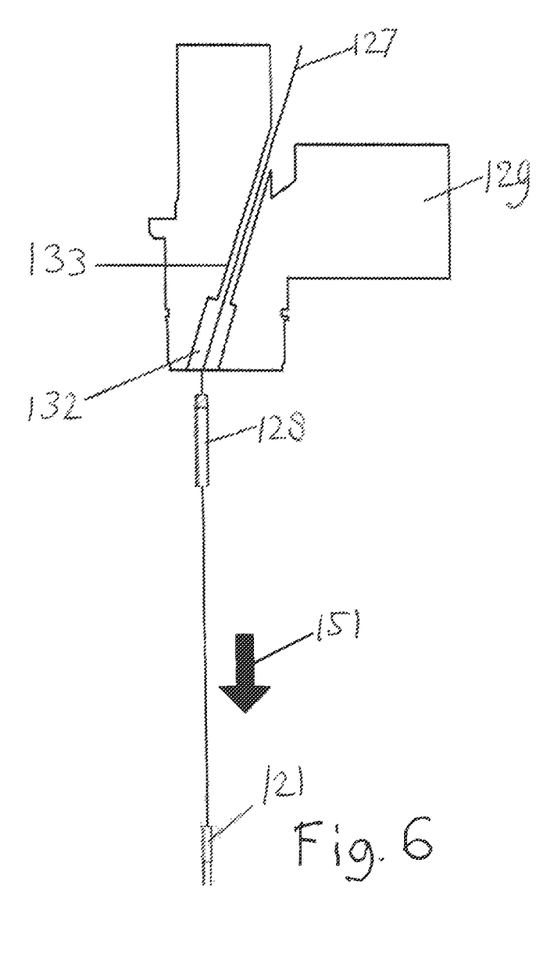
FIG. 6 is a schematic cross section corresponding to the longitudinal section of FIG. 4 and illustrating a first step in the mounting of a combustion sensor in a fuel injector.
Figure 7:
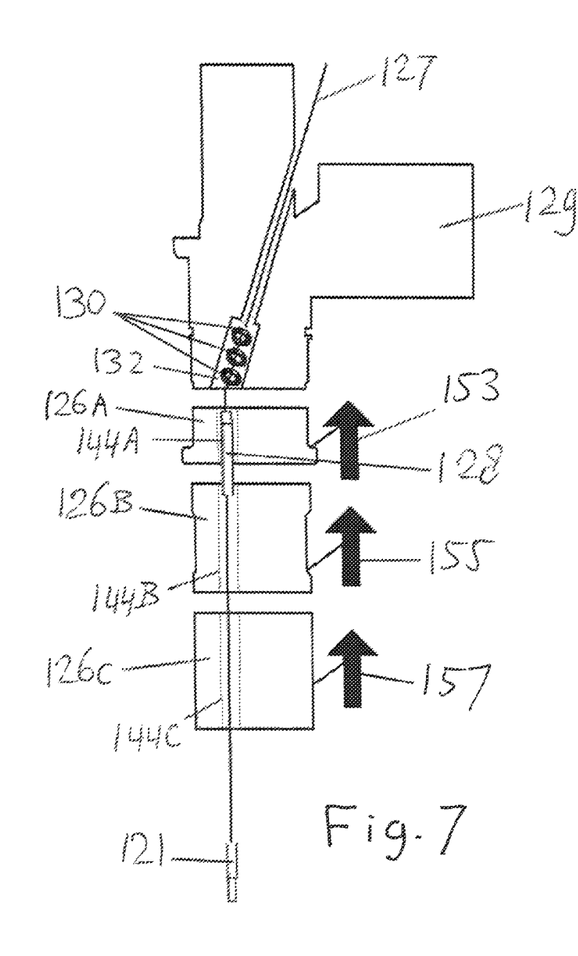
FIG. 7 is a schematic cross section similar to FIG. 6 showing a subsequent step in the assembly and mounting of the fuel injector and sensor.
Figure 8:
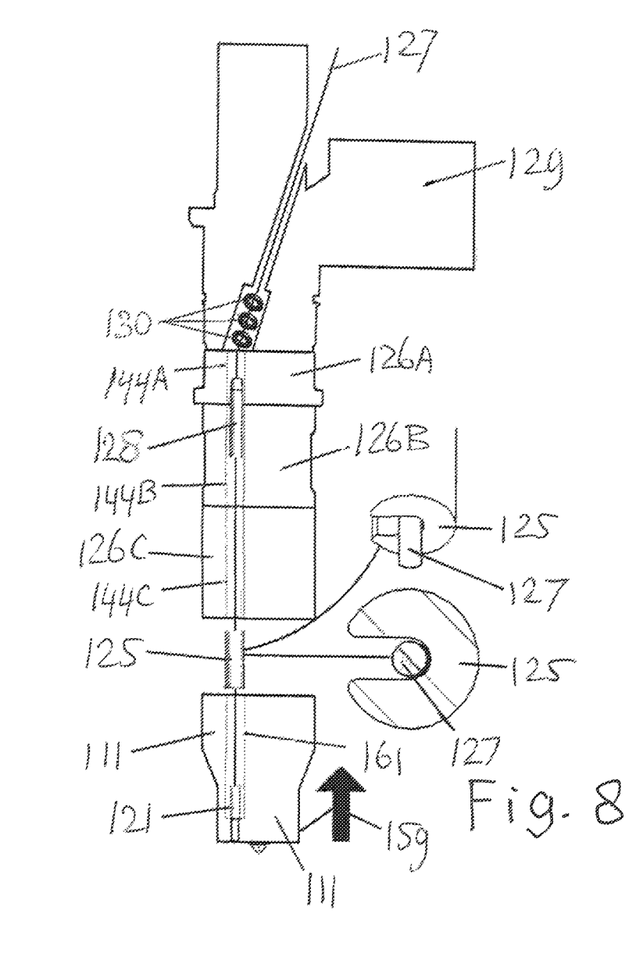
FIG. 8 is a schematic cross section similar to FIG. 7 showing yet a further subsequent step of assembly and mounting.
Figure 9:
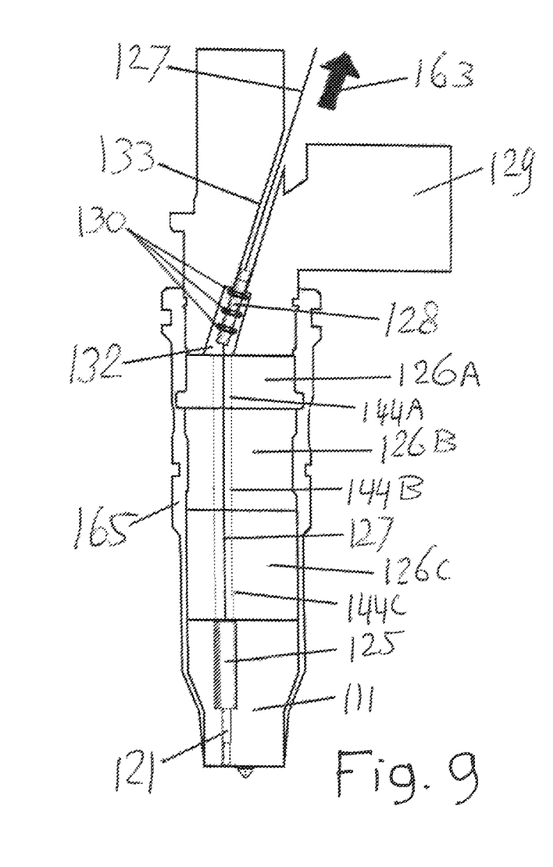
FIG. 9 is a schematic cross section similar to FIG. 8 showing a final assembly and mounting step.

FIGS. 6, 7, 8 and 9 show successive stages of mounting a sensor, such as a combustion pressure sensor in a slightly modified embodiment of the one shown in FIGS. 4 and 5. Hence the reference numerals used for similar structures will differ a full "100" from those previously used. As seen in FIG. 6 a signal wire 127 is first inserted through the sensor channel 133 and sealing housing 132 of a pump housing 129. Insertion can be generally in the direction of arrow 151, because both the combustion pressure sensor (or other sensor) 121 and the sealing body 128 can pass through the sensor channel 133 in the pump housing 129. As further shown in FIG. 7 three sealing rings 130 are threated over the signal wire 127 to be accommodated in the seal housing 132. Elements forming a spring housing, and comprising an upper spring housing element 126A, a middle spring housing element 126B, and a lower spring housing element 126C are also positioned over the signal wire 127 and positioned against the pump housing 129, as well as against each other, in the direction of arrows 153, 155, 157. Each of the spring housing elements has a respective duct 144A, 144B, 144C allowing passage of the signal wire 127, as well as of the sensor 121 and sealing body 128. It is further shown in FIG. 8 how the upper, middle and lower spring housing element 126A, 126B, 126C are positioned against the pump housing 129. In the mounting step illustrated in FIG. 8 the sealing body is still positioned in the aligned ducts 144A and 144B, and has not yet entered the seal housing 132. Thereby the position of the sensor 121 is still below its final position. Thereby sufficient space is left between the lower spring housing element 126C and nozzle holder 111, which accommodates sensor 121, for a U-shaped spacer 125 to be inserted. Schematically it is also indicated in FIG. 8 how the U-shaped spacer 125 engages over the signal wire 127. Once the U-shape spacer 125 is positioned as shown in FIG. 8 the nozzle holder 111 can be offered upwardly in the direction of arrow 159. The U-shaped spacer 125 can then be accommodated in a sensor duct 161 of the nozzle holder 111. The outside diameter of the U-shaped spacer 125 is made to snuggly fit within a diameter of the sensor duct 161, but exceeds the diameter of the duct 144C of the lower spring housing element 126C. The result of carrying out the step of FIG. 8 is shown in FIG. 9. In FIG. 9 the final position is shown of the spring housing elements 126A, 126B, 126C and the nozzle holder 111 with respect to the pump housing 129. To arrive at this position the signal wire 127 has been pulled from the sensor channel 133 in the direction of arrow 163. Thereby the sealing body 128 has entered the seal housing 132 and is sealed therein by the three sealing rings 130. Also shown in FIG. 9 is that an outer sleeve 165 has been added to firmly connect the spring housing elements 126A, 126B, 126C, and the nozzle holder 111 to the pump housing 129. The outer sleeve 165 is advantageously screwed onto the pump housing 129 and exerts sufficient tension to obtain a leak-proof and fluid pressure resistant connection of the individual components.

Figure 10:
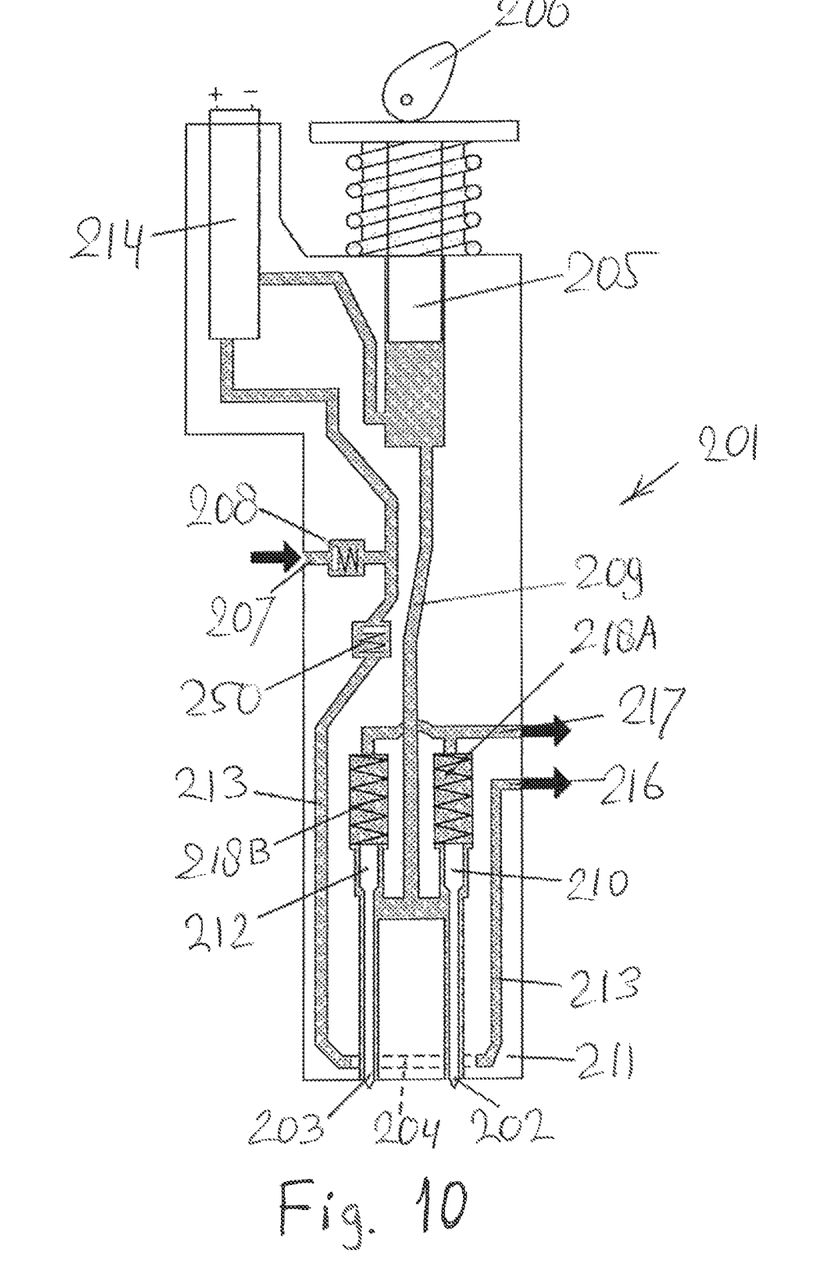
FIG. 10 is a schematic longitudinal section similar to FIG. 2 of a different form of injector assembly in accordance with the invention.

An alternative embodiment of injector is shown in FIG. 10, which is a schematic central cross section corresponding to FIG. 2. The fuel injector 201 of FIG. 10 will be referred to by reference numerals generally a full "200" higher than those used in FIGS. 1-3, to denote similar structures. The fuel injector 201 is suitable for dual fuel operation of an internal combustion engine (not shown, but conventional). The assembly of this fuel injector 201 includes a nozzle holder 211 which defines a fuel circuit. This fuel circuit includes a fuel supply channel 207, which via a one-way value 208 is in fluid communication with an electrically operated spill valve 214. The spill valve 214, in contrast to the spill valve 14 of the embodiment of FIGS. 1-3, is now positioned upstream of the pump 205. As part of the fuel circuit the pump 205 is in fluid connection with first and second injector nozzles 202, 203 by means of fuel supply channel 209. A downstream nose of the nozzle holder 211, where tips of first and second needle 210, 212 close the respective first and second injector nozzles 202, 203, is adapted to be exposed to a combustion space of an internal combustion engine (not shown, but conventional). Thereby the first and second nozzles 202, 203, which are in communication with the fuel circuit of the nozzle holder 211 are arranged for directly injecting fuel into the combustion space. The first injector nozzle 202 can be a micro-pilot injector that is arranged for ignition of a combustible mixture present in a combustion space of an internal combustion engine. The first and second nozzles 202, 203 adjacent to the downstream nose of the nozzle holder are associated with by a cooling duct or channel 204, through which excess fuel flows and which cools the nose area of the injector 201. At each actuation of the pump 205, which is embodied here as a piston or plunger pump, the full volume of a single pump stroke effected by a camshaft 206 is allowed to flow through the cooling channel, and past the first and second nozzles 202, 203. The injector 201 further comprises the electrically operated spill valve 214 in the fuel circuit, which is controlled to open or to close in accordance with the required amounts of fuel to be delivered to the first and second nozzles 202, 203. The injector 201 also has a fuel discharge outlet 216 and a fuel leak outlet 217 for returning yet unused fuel to a fuel tank (now shown, but conventional). Similar to the embodiment of FIGS. 1-3, the opening of the first and second nozzle needles is also controlled by appropriate compression springs 218A, 218B. The pump 205 is activated by the camshaft 206 in dependency of the combustion engine's operating cycle. In this example the first and second nozzle needles 210, 212 are parallel to one another. An optional one-way valve 250 may additionally be included in a fuel discharge channel 213, which connects the cooling channel 204 to the spill valve 214 to restrict pump suction of the pump 205 to the fuel supply channel 207.

Figure 11:
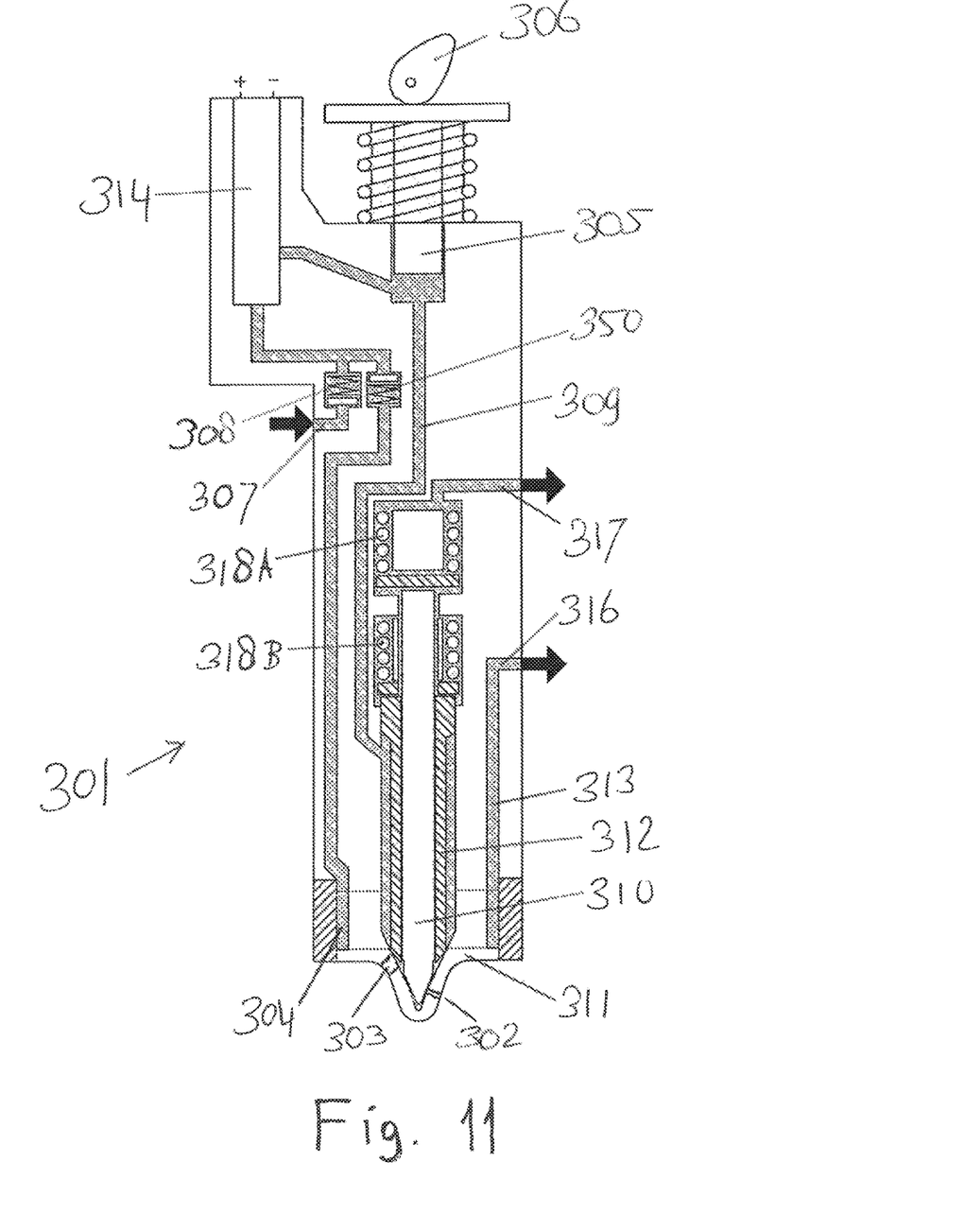
FIG. 11 is a schematic longitudinal section similar to FIGS. 2 and 10 of another different form of injector assembly in accordance with the invention.

A further alternative embodiment of an injector 301 is shown in FIG. 11. Again the cross section of FIG. 11 corresponds with those of FIGS. 2 and 10, while reference numerals are again used for similar structure that differ a full "200" and a full "300", respectively from those used before. The fuel injector 301 notably differs from the embodiments described so far in that the first and second nozzle needles 310, 312 are arranged concentrically with respect to each other, rather than next to one another. A nozzle holder 311 has an internal fuel circuit including a fuel supply channel 307 in fluid connection with a solenoid operated spill value 314 via a one-way valve 308. The spill valve 314, in turn, communicates with a suction side of pump 305, discharges pressurized fuel through a fuel supply channel 309 to the exterior of the concentric first and second nozzle needles 310, 312. Any fuel that is not injected by the first and second nozzles 302, 303 is circulated through a cooling channel 304 surrounding the nose of the nozzle holder 311 that in use will be exposed to a combustion space of an internal combustion engine. From the cooling channel 304 the excess fuel is discharged via discharge channel 313 to a fuel discharge outlet 316. Fuel that leaks from the spring housing is discharged via a fuel leak outlet 317. Fuel that exits the discharge outlet 316 and fuel leak outlet 317 may be reused and can be returned to a fuel tank. A first compression spring 318A controls the opening pressure of the first nozzle needle 310. A second compression spring 318B controls the opening pressure of the second nozzle needle 312. Selection of spring characteristics, and control of the spill valve 314 are again accomplished in a similar manner as already explained for the other embodiments. An optional additional one-way valve 350 can be provided between the cooling channel 304 and the spill valve 314 to limit suction of the pump 305 to the fuel supply channel 307.

In the embodiments of FIGS. 10 and 11 the one-way valve associated with the fuel supply is isolated from the high pressure circuit between the pump and the injection nozzles. Any malfunction of the one-way valve and/or the spill valve thereby has less consequences for the operation of an internal combustion engine, because the fuel injection amount cannot get out of control.

With the embodiment of FIG. 11 the concentric nozzles are easier to manufacture, result in a more compact size of the injector nose, and eliminates spray crossing of the nozzles, which can occur when the nozzles are parallel.

Accordingly an assembly is described that at least comprises a fuel injector for dual fuel operation of an internal combustion engine. The assembly includes a nozzle holder defining a fuel circuit and provided with a nose adapted in use to be in connection with a combustion space of an internal combustion engine, and first and second nozzles in communication with the fuel circuit in the nozzle holder for directly injecting liquid fuel into the combustion space of the internal combustion engine for ignition of a combustible mixture present in the combustion space. The first and second nozzles adjacent to the nose of the nozzle holder are interconnected by a cooling channel. At each actuation of a fuel pump upstream of the first and second nozzles, substantially a full volume of fuel pumped during actuation of the fuel pump is allowed to flow through the cooling channel and via the first and second nozzles, to provide cooling thereof. The assembly further comprises a spill valve in the fuel circuit. Opening and closing of the spill valve controls the amount of liquid fuel to be delivered to the first and second nozzles. The invention as hereinabove disclosed thus relates to a dual fuel injector for internal combustion engines with a piston and a crankshaft which run on a majority of gas as a fuel and a small amount of diesel fuel to ignite the gas mixture. The combination of the technologies in the dual fuel injector, according to the invention, includes double nozzles, a cooling arrangement on the basis of a diesel fuel flow through the nozzle nose to cool the injectors, a diesel main injector, a diesel micro-pilot, a combustion pressure sensor, a temperature sensor, optionally a diesel pressure sensor, a gas injector, a gas leak detection system, and a skip fire algorithm that controls the injector to ensure that the emissions of $NO_x$ and $CH_4$ is minimized.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. An assembly, functionally associated with a fuel pump, said assembly comprising:
   a fuel injector for single or dual fuel operation of an internal combustion engine;
   a nozzle holder defining a fuel circuit and provided with a nose adapted, in use, to be in connection with a combustion space of said internal combustion engine;
   a spill valve disposed in said fuel circuit; and
   at least one single nozzle in communication with said fuel circuit and disposed adjacent to said nose of said nozzle holder, said at least one single nozzle being functionally associated with a cooling channel and being adapted for directly injecting liquid fuel into said combustion space of said internal combustion engine for ignition of a combustible mixture present in said combustion space based on compression ignition,
   wherein said fuel pump is disposed upstream of said at least one single nozzle and is arranged, at each actuation, to pump a full pump volume of fuel, which volume of fuel is allowed to flow through said cooling channel and via said at least one single nozzle, to provide cooling thereof,
   wherein said fuel pump is a piston pump arranged to be actuated by a camshaft in dependency of a combustion engine cycle, and
   wherein opening and closing of said spill valve controls an amount of liquid fuel from said full pump volume of said fuel pump to be delivered by said at least one single nozzle.

2. The assembly of claim 1, wherein said piston pump is accommodated in said nozzle holder.

3. The assembly of claim 1, wherein actuation of said piston pump corresponds to a single pump stroke.

4. The assembly of claim 2, wherein actuation of said piston pump corresponds to a single pump stroke.

5. The assembly of claim 1, wherein said at least one single nozzle is one of a first nozzle and a second nozzle that are interconnected by said cooling channel or by a pressure channel, wherein said first and second nozzles each have a downstream injector tip positioned at said nose of said nozzle holder for fluid communication with a combustion space of said internal combustion engine, and wherein said cooling channel is in direct proximity of said downstream injector tips.

6. The assembly of claim 1, wherein said spill valve is positioned upstream of said fuel pump.

7. The assembly of claim 2, wherein said spill valve is positioned upstream of said fuel pump.

8. The assembly of claim 3, wherein said spill valve is positioned upstream of said fuel pump.

9. The assembly of claim 1, wherein said spill valve is positioned downstream of said fuel pump.

10. The assembly of claim 5, wherein said first nozzle is a micro-pilot injector and said second nozzle is a main injector,
    wherein an opening pressure of said micro-pilot injector is lower than an opening pressure of said main injector, and wherein said opening pressure of said micro-pilot injector is selected to inject fuel only through said micro-pilot fuel injector.

11. The assembly of claim 5, wherein said first nozzle is associated with a first nozzle needle for controlling opening and closing of said first nozzle, wherein said second nozzle is associated with a second nozzle needle for controlling opening and closing of said second nozzle, and wherein said first and second nozzle needles are parallel to each other.

12. The assembly of claim 1, wherein said at least one single nozzle comprises first and second nozzle needles arranged concentrically to each other.

13. The assembly of claim 1, wherein said at least one single nozzle comprises more than two nozzles.

14. The assembly of claim 1, wherein said at least one single nozzle is one of a first nozzle and a second nozzle that are interconnected by said cooling channel, and wherein said first and second nozzles are embodied as a micro-pilot injector and a main injector respectively, and wherein said micro-pilot injector is at least one of provided with one hole, with fewer holes than said main injector, or with smaller holes than said main injector.

15. The assembly of claim 1, wherein said fuel injector is operated as part of a common rail fuel supply.

16. The assembly of claim 1, wherein said fuel injector is equipped with a combustion pressure sensor, and wherein said combustion pressure sensor is press fit in said nozzle holder and thereby seals said nozzle holder against leakage causing changes in fuel pressure and in combustion pressure.

17. The assembly of claim 16, wherein said combustion pressure sensor is held in place by a U-shaped spacer dimensioned so as not to pass a spring housing above said combustion pressure sensor while being retained in a larger diameter duct in said nozzle holder.

18. The assembly of claim 1, further comprising a gas injector forming part of said nozzle holder, and wherein said gas injector is positioned adjacent said at least one single nozzle.

19. The assembly of claim 18, wherein said gas injector is positioned parallel to said at least one single nozzle or concentrically around said at least one single nozzle to cool said at least one single nozzle.

20. The assembly of claim 18, wherein said gas injector is fitted with a gas leak detection mechanism adapted to detect gas leaks between said connecting portions of said gas injector or between connecting portions of said gas injector in a gas rail or on a cylinder head, and parts of said injector, said gas leak detection mechanism including a detection channel isolated from an environment thereof by surrounding seals.

* * * * *